United States Patent
Otani et al.

(10) Patent No.: US 7,362,006 B2
(45) Date of Patent: Apr. 22, 2008

(54) STEERING LOCK

(75) Inventors: Kazuya Otani, Aichi (JP); Hiroshi Mori, Aichi (JP); Daisuke Someda, Aichi (JP); Tomoo Kakegawa, Aichi-ken (JP); Masachika Kamiya, Toyota (JP); Noriyasu Onishi, Aichi-ken (JP)

(73) Assignee: Kabushiki Kaisha Tokai Rika Denki Seisakusho, Aichi (JP)

( * ) Notice: Subject to any disclaimer, the term of this patent is extended or adjusted under 35 U.S.C. 154(b) by 326 days.

(21) Appl. No.: 11/194,340

(22) Filed: Aug. 1, 2005

(65) Prior Publication Data

US 2006/0028067 A1 Feb. 9, 2006

(30) Foreign Application Priority Data

Aug. 3, 2004 (JP) ............................. 2004-227130

(51) Int. Cl.
*H01H 27/00* (2006.01)

(52) U.S. Cl. .................................... 307/10.3

(58) Field of Classification Search ............... 307/10.2, 307/10.3
See application file for complete search history.

(56) References Cited

U.S. PATENT DOCUMENTS 4,250,976 A * 2/1981 Mochida .................... 180/271
6,784,631 B2 * 8/2004 Kollmann ................... 318/280
7,145,264 B2 * 12/2006 Nagae et al. ............. 307/10.2

FOREIGN PATENT DOCUMENTS

| DE | 199 45 867 A1 | 4/2001 |
|---|---|---|
| EP | 1 302 375 A2 | 4/2003 |
| EP | 1437271 A1 | 7/2004 |
| JP | 2003-63354 A | 3/2003 |

* cited by examiner

*Primary Examiner*—Michael Sherry
*Assistant Examiner*—Michael Rutland-Wallis
(74) *Attorney, Agent, or Firm*—Crompton, Seager & Tufte, LLC

(57) ABSTRACT

A steering lock for ensuring an unlock state when it is imperative that the steering lock remain in the unlock state. The steering lock includes a motor for generating drive force that engages and locks a lock bar with a steering shaft. The steering lock includes an ECU. When shifting the steering lock to the unlock state from a lock state, the ECU controls the motor to generate drive force acting in a direction to urge the lock bar to disengage from the steering shaft. The ECU continuously controls the motor to generate drive force acting in the direction to urge the lock bar to disengage from the steering shaft even after the lock bar has moved to the unlock position.

11 Claims, 2 Drawing Sheets

Unlock State

Unlock Operation ↑  Lock Operation ↓

Lock State

STEERING LOCK

BACKGROUND OF THE INVENTION

The present invention relates to a steering lock that locks a steering shaft with a lock bar.

Electronic steering locks for use in an automobile have been proposed in recent years. Such an electronic steering lock includes an electronic control unit (ECU) and a motor. The ECU controls the motor to produce torque used to move a lock bar so that the lock bar engages with or disengages from a steering shaft. The lock bar locks the steering shaft when engaged with the steering shaft and unlocks the steering shaft when disengaged from the steering shaft.

In an electronic steering lock, electric noise may cause the ECU to erroneously function and drive the motor in an unintended manner. Therefore, electronic steering locks are configured so that they do not lock the steering shaft when the vehicle is traveling. For example, Japanese Laid-Open Patent Publication No. 2003-063354 describes a steering lock provided with a power line, which includes a relay and a plurality of field effect transistors (FETs), for supplying the motor with power. The FETs are series-connected to the relay, which is connected to the motor. In this steering lock, the relay and the FETs must all be activated to drive the motor. This prevents the steering lock from locking the steering shaft when the vehicle is traveling even if electric noise causes the ECU to function erroneously.

Nevertheless, with the structure in which the FETs are series-connected to the relay, there still is a possibility of the motor being driven in an erroneous manner.

SUMMARY OF THE INVENTION

It is an object of the present invention to provide a steering lock that ensures a steering shaft remains unlocked under circumstances in which it is imperative that the steering shaft remains unlocked.

One aspect of the present invention is a steering lock for locking a steering shaft of a vehicle. The steering lock includes an actuator. A lock member is driven by the actuator to engage and lock the steering shaft. A control unit controls the actuator. The control unit controls the actuator to generate drive force acting in a direction to urge the lock member to move from a lock position in which the lock member engages the steering shaft to an unlock position in which the lock member is disengaged from the steering shaft. The control unit uses the drive force to move the lock member from the lock position to the unlock position. Further, the control unit controls the actuator to continuously generate the drive force acting in said direction to urge the lock member to move to the unlock position even after the lock member has moved to the unlock position.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A steering lock 1 according to a preferred embodiment of the present invention will now be described. The steering lock 1 is for use in an automobile.

Figure 1:
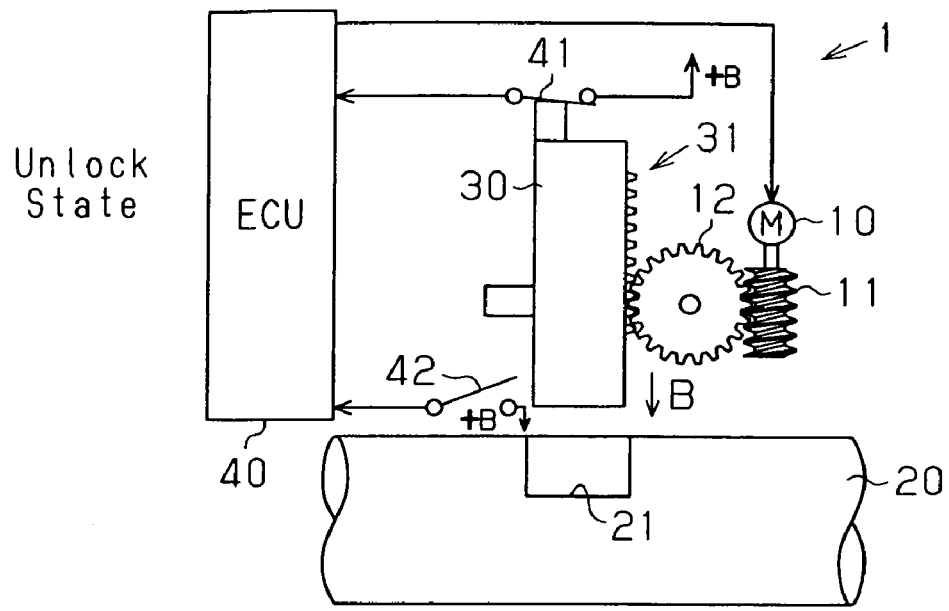
FIG. 1 is a schematic diagram showing a steering lock according to a preferred embodiment of the present invention.
Figure 1:
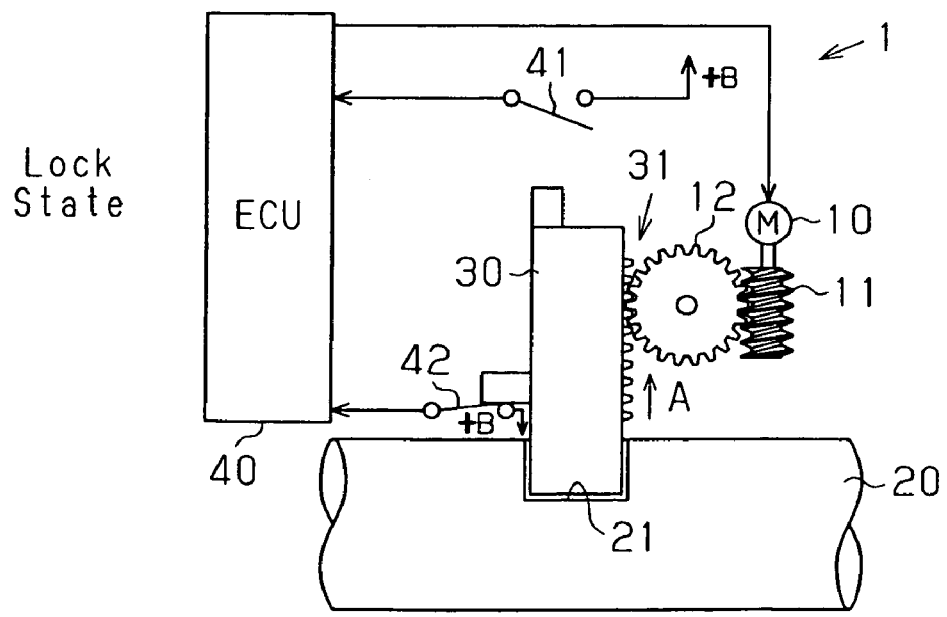

Referring to FIG. 1, the steering lock 1, which is of an electronic type, uses the drive force, or torque, produced by a motor 10 to lock a steering shaft 20 with a lock bar 30. The structure of the steering lock 1 will now be discussed.

As shown in FIG. 1, the steering lock 1 includes the motor 10, a worm 11, a spur gear 12, the lock bar 30, and an ECU 40. The motor 10 functions as an actuator for producing torque used to move the lock bar 30 so that the lock bar 30 engages with and disengages from the steering shaft 20. The motor 10 is a DC motor that rotates its output shaft in forward and reverse directions. The output shaft of the motor 10 is fixed to the worm 11. The worm 11 is mated with the spur gear 12, which is further mated with a rack 31 formed on the lock bar 30.

When the motor 10 is driven, the torque of the motor 10 is transmitted to the rack 31 of the lock bar 30 by the worm 11 and the spur gear 12. That is, the rotating motion produced by the motor 10 is converted to the linear motion of the lock bar 30 by a gear mechanism, which includes the worm 11, the spur gear 12, and the rack 31. The worm 11 and the spur gear 12 form a reduction gear that reduces the rotation speed of the motor output shaft. Thus, the rotation speed of the drive shaft, or the output shaft of the motor 10, is reduced in comparison to that of the driven shaft, or the rotary shaft to which the spur gear 12 is attached.

The steering lock 1 is in a lock state when the lock bar 30 is engaged with the steering shaft 20. The steering lock 1 is in an unlock state when the lock bar 30 is disengaged from the steering shaft 20. When a driver performs an operation for starting the engine, the steering lock 1 is in the lock state. Thus, the ECU 40 controls the motor 10 to rotate its output shaft in the forward direction so that the lock bar 30 moves in the direction indicated by arrow A in FIG. 1. This moves the lock bar 30 out of a lock groove 21, which is formed in the steering shaft 20. As a result, the steering lock 1 shifts from the lock state to the unlock state. Accordingly, when an engine starting operation is performed, the ECU 40 executes unlock control so that the motor 10 performs an unlock operation and rotates its output shaft in the forward direction. During the unlock operation, the motor 10 produces unlocking force applied to the lock bar 30 in the direction in which the lock bar 30 disengages the lock groove 21 of the steering shaft 20.

After the engine is stopped and the vehicle occupant opens and closes the door to leave the vehicle, the steering lock 1 is in the unlock state. Thus, the ECU 40 controls the motor 10 to rotate its output shaft in the reverse direction so that the lock bar 30 moves in the direction indicated by arrow B in FIG. 1. This moves the lock bar 30 into the lock groove 21 of the steering shaft 20 and shifts the steering lock 1 from the unlock state to the lock state. Accordingly, when the vehicle door is opened and closed after the engine is stopped, the ECU 40 executes lock control so that the motor 10 performs a lock operation and rotates its output shaft in the reverse direction. During the lock operation, the motor 10 produces locking force applied to the lock bar 30 in the direction in which the lock bar 30 engages the lock groove 21 of the steering shaft 20.

The lock bar 30 is movable between a lock position and an unlock position. In the lock position, the lock bar 30 is engaged with the lock groove 21 of the steering shaft 20. In the unlock position, the lock bar 30 is disengaged from the lock groove 21.

The steering lock 1 is provided with an unlock detection switch 41 and a lock detection switch 42. The unlock detection switch 41 closes and goes on when the lock bar 30 moves to the unlock position. This sends a signal having a high level, which indicates that the steering lock 1 is in the unlock state, to the ECU 40 from the unlock detection switch 41. As a result, the ECU 40 determines that the steering lock 1 is in the unlock state and enables the execution of various controls that requires the steering shaft 20 to be unlocked.

The lock detection switch 42 closes and goes on when the lock bar 30 moves to the lock position. This sends a signal having a high level, which indicates that the steering lock 1 is in the lock state, to the ECU 40 from the lock detection switch 42. As a result, the ECU 40 determines that the steering lock 1 is in the lock state and controls the motor 10 to stop rotating its output shaft in the reverse direction.

Figure 2:
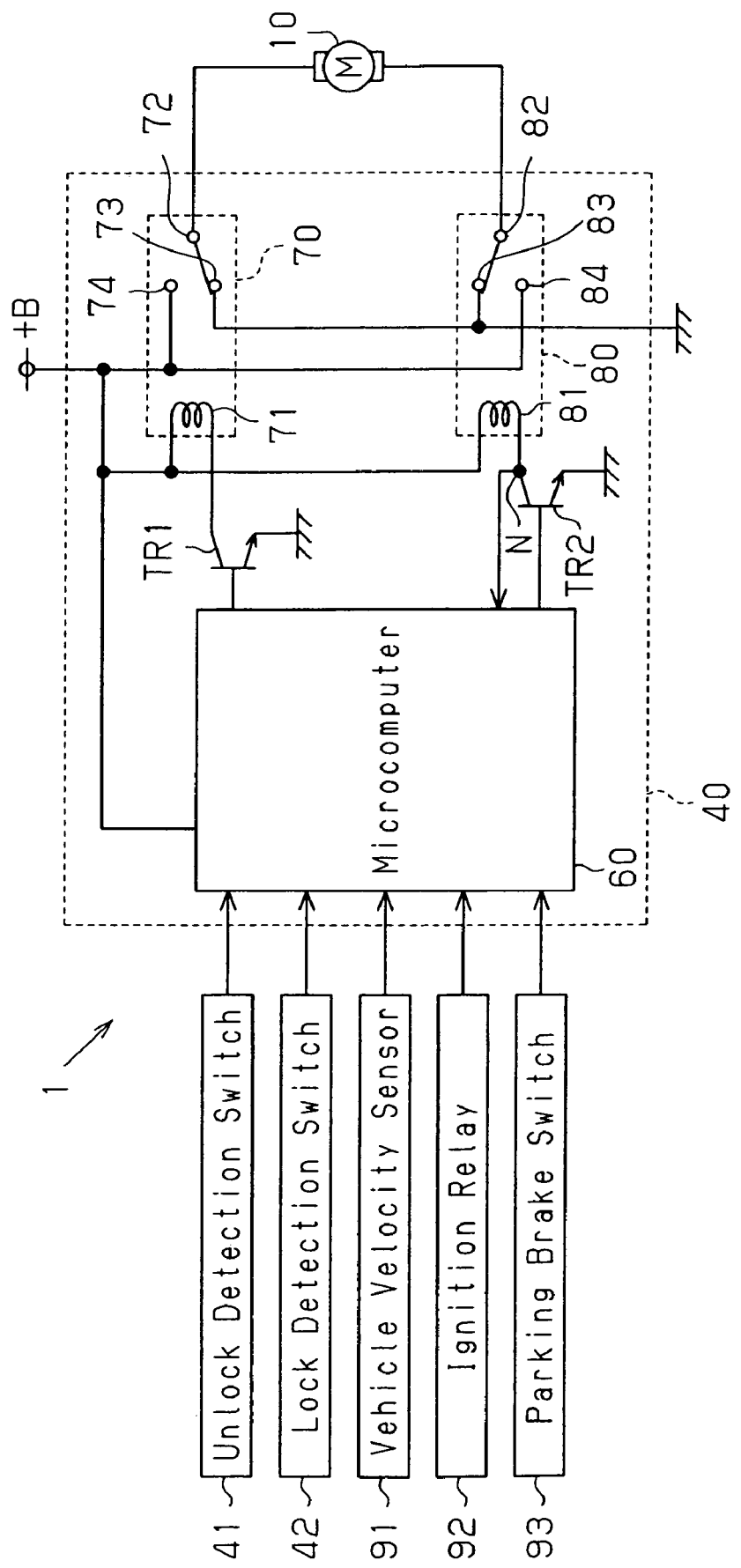
FIG. 2 is an electric circuit diagram of the steering lock shown in FIG. 1.

The configuration of the ECU 40 will now be described. As shown in FIG. 2, the ECU 40 includes a microcomputer 60, transistors TR1 and TR2, and relays 70 and 80. The microcomputer 60 includes a central processing unit (CPU), a read-only memory (ROM), a random-access memory (RAM), and a timer. The microcomputer 60 is powered by a vehicle battery via a DC-DC converter (not shown) to perform various controls.

The transistors TR1 and TR2 are each activated when receiving a signal having a high level from the microcomputer 60. The relay 70 includes a coil 71, a movable contact 72, a fixed negative contact 73, and a fixed positive contact 74. Further, the relay 80 includes a coil 81, a movable contact 82, a fixed negative contact 83, and a fixed positive contact 84. Activation of the transistor TR1 excites the coil 71 and switches the relay 70 from a state in which the movable contact 72 is electrically connected to the fixed negative contact 73 to a state in which the movable contact 72 is electrically connected to the fixed positive contact 74. Activation of the transistor TR2 excites the coil 81 and switches the relay 80 from a state in which the movable contact 82 is electrically connected to the fixed negative contact 83 to a state in which the movable contact 82 is electrically connected to the fixed positive contact 84. The motor 10 is electrically connected between the movable contact 72 of the relay 70 and the movable contact 82 of the relay 80.

When executing the unlock control, the microcomputer 60 sends a signal having a high level to the transistor TR1 while sending a signal having a low level to the transistor TR2. This activates the transistor TR1 and inactivates the transistor TR2. Thus, the coil 71 of the relay 70 is excited, and the coil 81 of the relay 80 is de-excited. As a result, during the unlock control, current flows from a positive terminal of the vehicle battery to a negative terminal of the vehicle battery via the fixed positive contact 74 and movable contact 72 of the relay 70, the motor 10, and the movable contact 82 and fixed negative contact 83 of the relay 80. Accordingly, an unlock power route extends from the positive terminal of the vehicle battery to the negative terminal of the vehicle battery via the fixed positive contact 74 and movable contact 72 of the relay 70, the motor 10, and the movable contact 82 and fixed negative contact of the relay 80. In this manner, the microcomputer 60 activates only the transistor TR1 during the execution of the unlock control so that the motor 10 rotates its output shaft in the forward direction.

During the execution of the unlock control, the microcomputer 60 determines that the steering lock 1 is in the unlock state when receiving a signal from the unlock detection switch 41 indicating that the lock bar 30 is located at the unlock position. If it becomes necessary to stop the motor 10 under such circumstance, the microcomputer 60 sends a signal having a low level to the transistor TR1 and a signal having a low level to the transistor TR2. This inactivates both of the transistors TR1 and TR2 and de-excites the coil 71 of the relay 70 and the coil 81 of the relay 80. Thus, current does not flow through the motor 10. As a result, the motor 10 stops rotating its output shaft in the forward direction.

When executing the lock control, the microcomputer 60 outputs a signal instructing locking. That is, the microcomputer 60 sends a signal having a high level to the transistor TR2 while sending a signal having a low level to the transistor TR1. This activates the transistor TR2 and inactivates the transistor TR1. Thus, the coil 81 of the relay 80 is excited, and the coil 71 of the relay 70 is de-excited. As a result, during the lock control, current flows from the positive terminal of the vehicle battery to the negative terminal of the vehicle battery via the fixed positive contact 84 and movable contact 82 of the relay 70, the motor 10, and the movable contact 82 and fixed negative contact 73 of the relay 70. Accordingly, a lock power route extends from the positive terminal of the vehicle battery to the negative terminal of the vehicle battery via the fixed positive contact 84 and movable contact 82 of the relay 80, the motor 10, and the movable contact 72 and fixed negative contact 73 of the relay 70. In this manner, the microcomputer 60 activates only the transistor TR2 during the execution of the lock control so that the motor 10 rotates its output shaft in the reverse direction.

During the execution of the lock control, if the microcomputer 60 receives from the lock detection switch 42 a signal indicating that the steering lock 1 is in the lock state, the microcomputer 60 sends a signal having a low level to the transistor TR1 and a signal having a low level to the transistor TR2. This inactivates both of the transistors TR1 and TR2 and de-excites the coil 71 of the relay 70 and the coil 81 of the relay 80. Thus, current does not flow through the motor 10. As a result, the motor 10 stops rotating its output shaft in the reverse direction. In this manner, the microcomputer 60 has the motor 10 stop rotating its output shaft in the reverse direction when determining that the steering lock 1 is in the lock state.

The features of the steering lock 1 will now be discussed. Referring to FIG. 2, the microcomputer 60 of the ECU 40 is electrically connected to a vehicle velocity sensor 91, an ignition relay 92, and a parking brake switch 93. The vehicle velocity sensor 91 generates a pulse signal in cycles corresponding to the velocity of the vehicle and sends the pulse signal to the microcomputer 60. The microcomputer 60 determines the vehicle velocity based on the pulse signal from the vehicle velocity sensor 91. When the vehicle velocity is not zero (i.e., when the vehicle is traveling), the microcomputer 60 causes the motor 10 to rotate its output shaft in the forward direction so as to perform the unlock operation.

Activation of the ignition relay 92 activates the ignition system of the vehicle. In this state, the ignition relay 92 sends a signal having a high level to the microcomputer 60. When the ignition relay 92 inactivates the ignition system, the ignition relay 92 sends a signal having a low level to the microcomputer 60. The microcomputer 60 determines whether or not the ignition system is activated based on the signal from the ignition relay 92. When the ignition system is activated, this indicates that the vehicle is in a state in which it may be driven. Thus, the microcomputer 60 controls the motor 10 to rotate its output shaft in the forward direction so as to perform the unlock operation.

When a parking brake is activated, the parking brake switch 93 sends a signal having a high level to the microcomputer 60. When the parking brake is inactivated, the parking brake switch 93 sends a signal having a low level to the microcomputer 60. The microcomputer 60 determines whether or not the parking brake is activated based on the signal from the parking brake switch 93. When the parking brake is inactivated (released), this indicates that the vehicle is in a state in which it may be driven. Thus, the microcomputer 60 controls the motor 10 to rotate its output shaft in the forward direction so as to perform the unlock operation.

The microcomputer 60 monitors the voltage level at a node N between the coil 81 of the relay 80 and the transistor TR2. The voltage level at the node N is high when the motor 10 is performing the unlock operation, that is, when the transistor TR2 is inactivated. The voltage level at the node N is low when the motor 10 is performing the lock operation, that is, when the transistor TR2 is activated. If the voltage level at the node N shows a decrease even though the microcomputer 60 is not executing the lock control, that is, even though the microcomputer 60 is not outputting a signal instructing locking, the microcomputer 60 controls the voltage level so that the motor 10 performs the unlock operation and rotates its output shaft in the forward direction.

Accordingly, even after the execution of the unlock control shifts the steering lock 1 to the unlock state, the microcomputer 60 continues controlling the motor 10 to rotate its output shaft in the forward direction so as to perform the unlock operation.

The preferred embodiment has the advantages described below.

(1) Even after the execution of the unlock control shifts the steering lock 1 to the unlock state, the microcomputer 60 continues controlling the motor 10 to perform the unlock operation. Thus, under a condition in which the steering lock 1 must remain in the unlock state, the motor 10 is prevented from performing the lock operation. This keeps the steering lock 1 in the unlock state.

(2) When the vehicle is traveling, the motor 10 is controlled to perform the unlock operation so as to keep the steering lock 1 in the unlock state. Further, audible noise produced by the motor 10 is offset by the audible noise produced when the vehicle travels. Thus, such noise would not cause the vehicle occupant to feel uncomfortable.

(3) When the vehicle is in a state in which it may be driven, the motor 10 is controlled to perform the unlock operation so as to keep the steering lock 1 in the unlock state. Thus, the steering lock 1 is in the unlock state even before the vehicle is driven.

(4) As long as the lock control is not executed, the motor 10 is forced to continuously perform the unlock operation even if there is a factor such as electric noise that would cause the motor 10 to erroneously perform the lock operation. This prevents the steering lock 1 from locking the steering shaft 20 when locking must be avoided.

(5) Unlike the steering lock of the prior art, FETs do not have to be connected in series to the relay 80 to keep the steering lock 1 in the unlock state. This reduces the cost of the steering lock 1.

It should be apparent to those skilled in the art that the present invention may be embodied in many other specific forms without departing from the spirit or scope of the invention. Particularly, it should be understood that the present invention may be embodied in the following forms.

The microcomputer 60 may control the motor 10 so that after the unlock control shifts the steering lock 1 to the unlock state, the unlock operation is performed with the current flowing through the motor 10 being smaller than that when the motor 10 is actually moving the lock bar 30. This reduces power consumption. For example, instead of the relays 70 and 80 and the transistors TR1 and TR2, four FETs may be employed to configure a full bridge, and the microcomputer 60 may execute pulse width modulation (PWM) control with the FETs. In this case, after the steering lock 1 shifts to the lock state, the microcomputer 60 may execute PWM control with an ON duty ratio that is smaller than that during the execution of the unlock control. In this case, however, it is preferred that the microcomputer 60 execute the PWM control at an ON duty ratio of 100% when the motor 10 attempts to perform the lock operation even though the lock control is not being executed.

After the engine is stopped, the motor 10 may be controlled to perform the unlock operation until the vehicle occupant opens and closes the vehicle door to leave the vehicle.

In the lock power route, switches such as FETs may be connected in series to the relay 80.

The actuator is not limited to the motor 10 and may be any type of motor.

The concavo-convexo relationship of the steering shaft 20 and the lock bar 30 may be reversed.

The present examples and embodiments are to be considered as illustrative and not restrictive, and the invention is not to be limited to the details given herein, but may be modified within the scope and equivalence of the appended claims.

What is claimed is:

1. A steering lock for locking a steering shaft of a vehicle, the steering lock comprising:
    an actuator;
    a lock member driven by the actuator to engage and lock the steering shaft; and
    a control unit for controlling the actuator, the control unit controlling the actuator to generate drive force acting in a direction to urge the lock member to move from a lock position in which the lock member engages the steering shaft to an unlock position in which the lock member is disengaged from the steering shaft, wherein the control unit uses the drive force to move the lock member from the lock position to the unlock position, and controls the actuator to continuously generate the drive force acting in said direction to urge the lock member to move to the unlock position even after the lock member has moved to the unlock position, and decreases current flowing to the actuator after the lock member has moved to the unlock position as the actuator continuously generates the drive force acting in the direction to urge the lock member to move to the unlock position with less power.

2. The steering lock according to claim 1, wherein the control unit includes a first transistor, a second transistor, a first relay connected to the first transistor, and a second relay connected to the second transistor, the control unit activating the first transistor to supply the actuator with power for generating the drive force acting in the direction to urge the lock member to move to the unlock position, and the control unit activating the second transistor to supply the actuator with power for generating drive force acting in another direction to urge the lock member to move to the lock position.

3. The steering lock according to claim 1, wherein the control unit supplies the actuator with power that is in accordance with a duty ratio to generate the drive force, the control unit, after the lock member has moved to the unlock position, decreasing the duty ratio when controlling the actuator to generate the drive force acting in the direction to urge the lock member to move to the unlock position.

4. The steering lock according to claim 1, wherein the control unit controls the actuator to generate the drive force acting in the direction to urge the lock member to move to the unlock position while the vehicle is traveling.

5. The steering lock according to claim 4, further comprising:
   a vehicle velocity sensor for detecting velocity of the vehicle, wherein the control unit determines whether or not the vehicle is traveling based on detection of the vehicle velocity sensor.

6. The steering lock according to claim 1, wherein the control unit controls the actuator to generate the drive force acting in the direction to urge the lock member to move to the unlock position when traveling of the vehicle is enabled.

7. The steering lock according to claim 6, wherein the vehicle includes an ignition system, the steering lock further comprising:
   an ignition relay connectable to the vehicle for activating the ignition system, wherein the control unit determines that traveling of the vehicle is enabled when the ignition relay has activated the ignition system.

8. The steering lock according to claim 6, wherein the vehicle includes a parking brake, the steering lock further comprising:
   a parking brake switch connectable to the vehicle for activating and inactivating the parking brake, wherein the control unit determines that traveling of the vehicle is enabled when the parking brake switch has inactivated the parking brake.

9. The steering lock according to claim 1, wherein the vehicle includes an ignition system and a parking brake, and the control unit controls the actuator to generate the drive force acting in the direction to urge the lock member to move to the unlock position when any one of the following conditions is satisfied:
   the vehicle is traveling;
   the ignition system of the vehicle is activated; and
   the parking brake of the vehicle is inactivated.

10. The steering lock according to claim 1, wherein the control unit issues a signal instructing locking to control the actuator to generate drive force acting in another direction for moving the lock member from the unlock position to the lock position, the control unit using the drive force acting in said another direction to move the lock member from the unlock position to the lock position, and the control unit controlling the actuator to generate the drive force acting in the direction to urge the lock member to move to the unlock position when there is a possibility of the actuator generating the drive force acting in said another direction even though the signal instructing locking has not been issued.

11. The steering lock according to claim 10, wherein the control unit includes a first transistor, a second transistor, a first relay connected to the first transistor, and a second relay connected to the second transistor, the control unit activating the first transistor to supply the actuator with power for generating the drive force acting in the direction to urge the lock member to move to the unlock position, the control unit activating the second transistor to supply the actuator with power for generating drive force acting in said another direction to urge the lock member to move to the lock position, and the control unit monitoring voltage between the second transistor and the second relay to determine the possibility of the actuator generating the drive force acting in the direction to urge the lock member to move to the lock position.

* * * * *